United States Patent
Xu et al.

(10) Patent No.: US 6,813,313 B2
(45) Date of Patent: Nov. 2, 2004

(54) METHOD AND SYSTEM FOR HIGH-LEVEL STRUCTURE ANALYSIS AND EVENT DETECTION IN DOMAIN SPECIFIC VIDEOS

(75) Inventors: Peng Xu, New York, NY (US); Shih-Fu Chang, New York, NY (US); Ajay Divakaran, Denville, NJ (US)

(73) Assignee: Mitsubishi Electric Research Laboratories, Inc.

( * ) Notice: Subject to any disclaimer, the term of this patent is extended or adjusted under 35 U.S.C. 154(b) by 657 days.

(21) Appl. No.: 09/839,924

(22) Filed: Apr. 20, 2001

(65) Prior Publication Data

US 2002/0018594 A1 Feb. 14, 2002

Related U.S. Application Data

(63) Continuation-in-part of application No. 09/610,763, filed on Jul. 6, 2000.
(51) Int. Cl.[7] .............................. H04N 7/12; G06K 9/46
(52) U.S. Cl. ................ 375/240.08; 382/243; 348/399.1
(58) Field of Search ..................... 375/240.08, 240.09, 375/240.16; 348/402.1, 416.1, 399.1; 382/173, 180, 195, 243; 345/968

(56) References Cited

U.S. PATENT DOCUMENTS 5,802,361 A * 9/1998 Wang et al. ................. 382/217
6,079,566 A * 6/2000 Eleftheriadis et al. ...... 707/101
6,490,370 B1 * 12/2002 Krasinski et al. ........... 382/195
6,516,090 B1 * 2/2003 Lennon et al. .............. 382/173

OTHER PUBLICATIONS

Gong et al., "Automatic Parsing of TV Soccer Programs"; Proceedings of the International Conference on Multimedia Computing and Systems (ICMCS), pp. 167–174, May 1995.

Zhong et al., "Structure Analysis of Sports Video Using Domain Models"; submitted to IEEE Conference on Multimedia and Exhibition, Japan, Jan. 2001.

\* cited by examiner

*Primary Examiner*—Gims Philippe
(74) *Attorney, Agent, or Firm*—Dirk Brinkman; Andrew J. Curtin (57) ABSTRACT

A system and method analyzes a compressed video including a sequence of frames. The amount of a dominant feature in each frame of the compressed video is measured. A label is associated with each frame according the measured amount of the dominant feature. Views in the video are identified according to the labels, and the video is segmented into actions according to the views. The video can then be analyzed according to the action to determine significant events in the video.

12 Claims, 8 Drawing Sheets

METHOD AND SYSTEM FOR HIGH-LEVEL STRUCTURE ANALYSIS AND EVENT DETECTION IN DOMAIN SPECIFIC VIDEOS

RELATED APPLICATION

This application is a Continuation-in-Part Application of U.S. patent application Ser. No. 09/610,763 "Extraction of High-Level Features from Low-Level Features of Multimedia Content" filed by Chang et al. on Jul. 6, 2000.

FIELD OF THE INVENTION

The invention relates generally to the field of video analysis, and more particularly to analyzing domain specific videos.

BACKGROUND OF THE INVENTION

As digital video becomes more pervasive, efficient ways of analyzing the content of videos become necessary and important. Videos contain a huge amount of data and complexity that make the analysis very difficult. The first and most important analysis is to understand the structure of the video, which can provide the basis for further detailed analysis.

A number of analysis methods are known, see M. M. Yeung, B. L. Yeo, W. Wolf, and B. Liu, "Video Browsing using Clustering and Scene Transitions on Compressed Sequences," Multimedia Computing and Networking 1995, Vol. SPIE 2417, pp. 399–413, February 1995, M. J. Yeung and B. L. Yeo, "Time-constrained Clustering for Segmentation of Video into Story Units, ICPR, Vol. C. pp. 375–380 August 1996, D. Zhong, H. J. Zhang and S. F. Chang, "Clustering Methods for Video Browsing and Annotation," SPIE Conference on Storage and Retrieval for Image and Video Databases, Vol. 2670, February 1996, J. Y. Chen, C. Taskiran, E. J. Delp and C. A. Bouman, "ViBE: A New Paradigm for Video Database Browsing and Search. In Proc. IEEE Workshop on Content-Based Access of Image and Video Databases, 1998, and Gong, Sin, Chuan, Zhang and Sakauchi, "Automatic Parsing of TV Soccer Programs," Proceedings of the International Conference on Multimedia Computing and systems (ICMCS), May 1995.

Gong et al. describe a system that uses domain knowledge and domain-specific models in parsing the structure of a soccer video. Like other prior art systems, a video is segmented first into shots. Video features extracted from frames within each shot are used to classify each shot into different categories, e.g., penalty area, midfield, corner area, corner kick, and shot at goal. Note that work relies heavily on accurate segmentation of video into shots before features are extracted.

Zhong et al. also describe a system for analyzing sport videos. The system provides detects boundaries of high-level semantic units, e.g., pitching in baseball and serving in tennis. Each semantic unit is further analyzed to extract interesting events, e.g., number of strokes, type of plays—returns into the net or baseline returns in tennis. A color-based adaptive filtering method is applied to a key frame of each shot to detect specific views. Complex features, such as edges and moving objects, are used to verify and refine the detection results. Note that this work also relies heavily on accurate segmentation of the video into shots prior to feature extraction. In short, both Gong and Zhong consider the video to be a concatenation of basic units, where each unit is a shot. The resolution of the feature analysis does not go finer than the shot level.

Thus, generally the prior art is as follows: first the video is segmented into shots. Then, key frames are extracted from each shot, and grouped into scenes. The scene transition graph and hierarchy tree are used to represent these data structures. The problem with those approaches is the mismatch between the low-level shot information, and the high-level scene information. They can only work when interesting content changes correspond to the shot changes. In many applications such as soccer videos, interesting events such as "plays" cannot be defined by shot changes. Each play may contain multiple shots that have similar color distributions. Transitions between plays are hard to find by simple clustering of shot features.

In many situations, when the camera has a lot of motion, shot detection processes tend to have many false alarms because this type of segmentation is from low-level features without considering the domain-specific syntax and content model of the video. Thus, it is difficult to bridge the gap between low-level features and high-level features based on shot-level segmentation. Moreover, too much information is lost during the shot segmentation process.

Videos in different domains have very different characteristics and structures. Domain knowledge can greatly facilitate the analysis process. For example, in sports videos, there are usually a fixed number of cameras, views, camera control rules, and transition syntax imposed by the rules of the game, e.g., play-by-play in soccer, serve-by-serve in tennis, and inning-by-inning in baseball.

Y. P. Tan, D. D. Saur, S. R. Kulkami and P. J. Ramadge in "Rapid estimation of camera motion from compressed video with application to video annotation," IEEE Trans. on Circuits and Systems for Video Technology, 1999, and H. J. Zhang, S. Y. Tan, S. W. Smoliar and Y. H. Gong, in "Automatic Parsing and Indexing of News Video," Multimedia Systems, Vol. 2, pp. 256–266, 1995, describe video analysis for news and baseball. But very few systems consider high-level structure in more complex videos such as a soccer video.

The problem is that a soccer game has a relatively loose structure compared to other videos like news and baseball. Except the play-by-play structure, the content flow can be quite unpredictable and happen randomly. There are a lot of motion and view changes in soccer.

Therefore, there is a need for a framework where all the information of low-level features of a video are retained, and the feature sequences better represented. Then, it can become possible to incorporate a domain-specific syntax and a content model, and high level structure to enable event detection, and statistical analysis.

SUMMARY OF THE INVENTION

The invention provides a general framework for video structure discovery and content analysis. In the method and system according to the invention, frame-based low-level features are extracted from a video. Each frame is represented by the values of features or labels converted from the features to convert the video to multiple label sequences or real number sequences. Each of such sequences is associated with one of the extracted low-level feature. The feature sequences are analyzed together to extract high-level semantic features.

The invention can be applied to videos of sport activities, such as soccer games to index and summarize the video. The invention uses a distinctive feature to capture the high-level structure of the soccer video, e.g., activity boundaries, and use a unique feature, e.g., grass orientation, together with camera motion to detect interesting events such as game strategy. The unique aspects of the system include compressed-domain feature extraction for real-time performance, use of domain specific features for detecting high-level events, and integration of multiple features for content understanding.

Particularly, the system and method according to the invention analyzes a compressed video including a sequence of frames. The amount of a dominant feature in each frame of the compressed video is measured. A label is associated with each frame according the measured amount of the dominant feature. Views in the video are identified according to the labels, and the video is segmented into actions according to the views. The video can then be analyzed according to the action to determine significant events in the video.

The dominant feature, labels, views, action, and significant events are stored in a domain knowledge database. In one embodiment, the dominant feature is color, and a color histogram is constructed to identify the dominant feature.

DETAILED DESCRIPTION OF THE PREFERRED EMBODIMENT

System Overview

Figure 1:
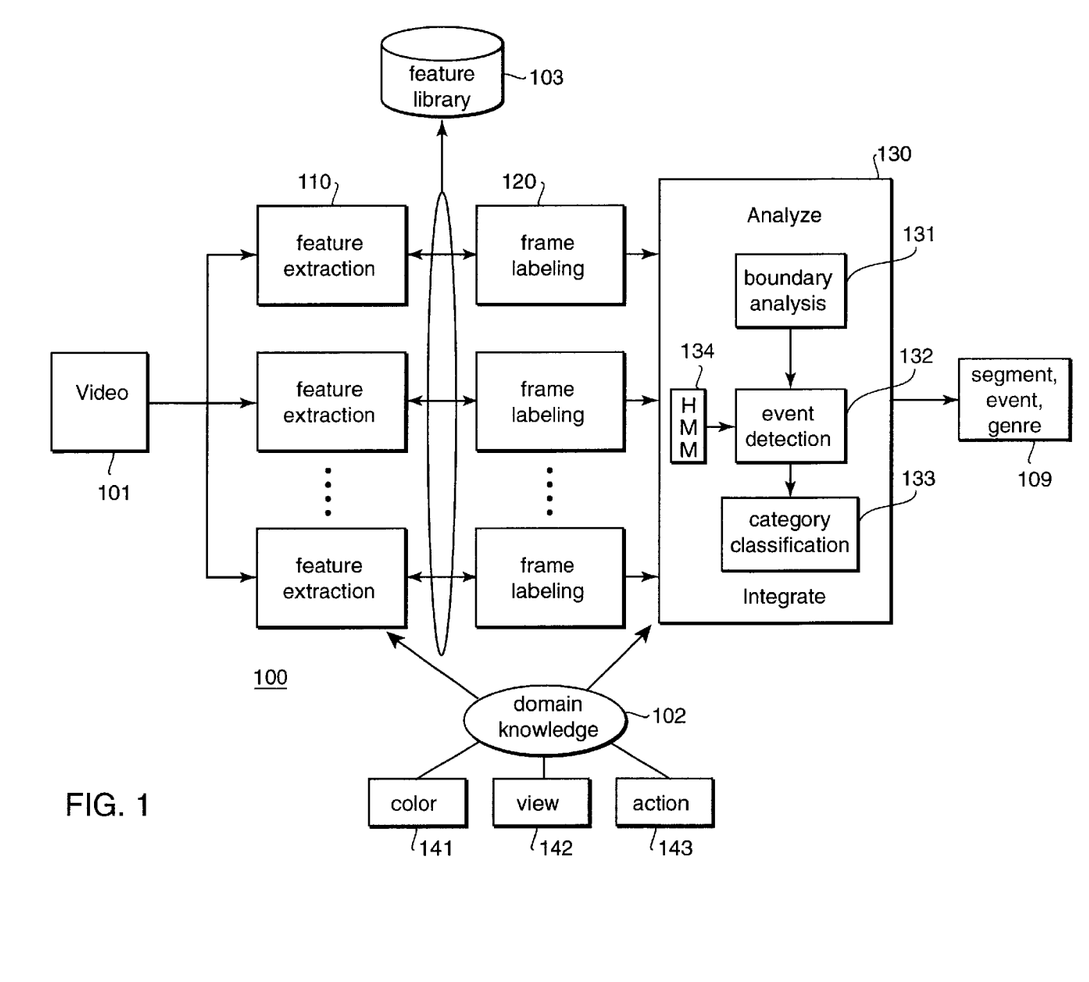
FIG. 1 is a block diagram of a system and method for analyzing high-level structure and events in domain specific videos.

FIG. 1 shows a system and method 100 according to our invention. The system takes a video 101 as input to produce high level features 109. Based on a domain knowledge database 102, appropriate frame-based features are selected and extracted 110, and stored in a feature library 103. The extracted features are converted 120 to label sequences, also stored in the library 103. The individual labels can be classes of the features, quantized discrete numbers, or the features themselves. Then, the multiple label sequences are integrated and analyzed 130. Event boundaries 131 and categorized classifications 133 can be used to detect significant events 132 according to the domain knowledge database 102.

Event boundaries from different label sequences may be synchronous or asynchronous. Synchronous boundaries can indicate significant content change, and asynchronous boundaries can indicate complementary information. Event transitions can be modeled using a hidden Markov model (HMM) 134, or other machine learning techniques. Multiple hidden Markov models can be combined to detect special events. Domain-specific hidden Markov models can be trained to segment and recognize classes of videos like news, weather, commercial, as well as loosely structured such as those of soccer games.

Domain Specific Video Analysis System

We now describe the use of our system and method 100 for a domain specific application, e.g., sport videos. We will first describe observations of structure and syntax in a specific domain knowledge database 102. Then, we describe unique features and efficient methods for extracting such features to determine event boundaries, categorize the activities in the videos, and detect interesting events.

Structure of Domain Knowledge Database

We define the domain knowledge database 102 of the video 101 according to three major features, color 141, view 142, and action 143. The extracted color is used to identify views, and the labeled views are used to segment the action in the video.

Feature Extraction

Because the playing area of a sporting event usually has a dominant color feature, we use this feature to perform view classification. In a compressed video, we only use I-frames, and the color extraction is performed on the color thumbnail images of I-frames from their DC coefficients without decoding the frames of the video.

A soccer field is identified by its unique dominant green color, and the perceived green is best identified by its hue value, between 0.2 and 0.3. So, we detect the field the hue of the grass green. The hue of the pixel in the thumbnail image can be calculated by the color space transformation from YCbCr to RBG to HSV. Of course in other loosely structured games, such as ice hockey, the playing area has a white dominant color, and in basketball the parquet floor is usually tan.

Typically, the hue of the playing area is quite consistent across different videos. But if we want to achieve a higher accuracy, this value can be calibrated for different videos. According to statistics, more than 80% of the frames in the soccer video belong to the first two types of views containing grass area. A number of frames are selected randomly from a segment that is long enough to contain several plays.

Figure 2:
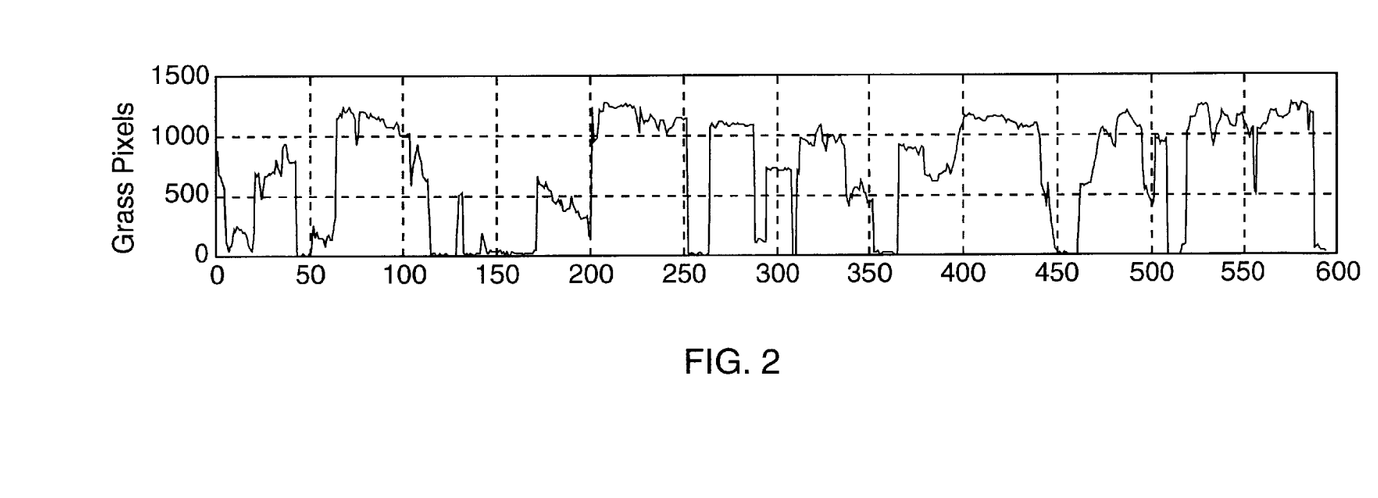
FIG. 2 is a cumulative histogram of hue determined by measuring a color in selected frames of the video.

As shown in FIG. 2, a cumulative histogram on hue is determined by measuring the color in the selected frames. The peak of the histogram between 0.2 and 0.3 gives the hue value, $h_g$. Then, in the thumbnail image, pixels having the hue only in the range $[h_g-0.05, h_g+0.05]$ are considered as green. The frames, as indicated on the x-axis, are classified according to the number of the green pixels, on the y-axis. The number of green pixels is very distinctive for the three classes. Therefore, the threshold is easy to find by trails and can be used across different videos.

Color Analysis and View Identification

Figure 3:
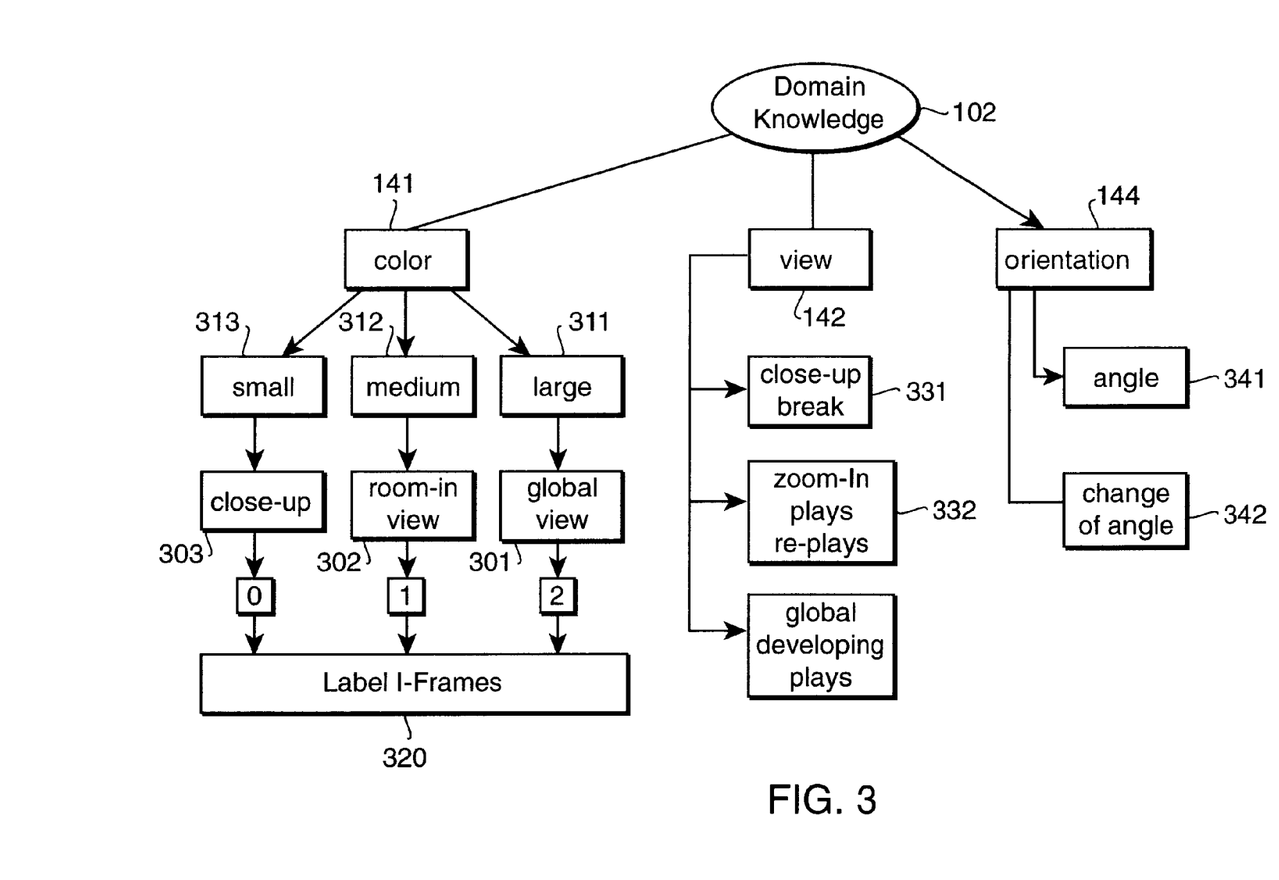
FIG. 3 is a flow diagram of an application of domain knowledge to a video to determine structure and events.

As shown in FIG. 3, we identify three kinds of dominant views in a sport video, a global view 301, a zoom-in 302, or a close-up 303. A global view is shot from the top and side. It gives the whole-picture view of the current play of the game. In this view, the grass field covers a large area 311, and players appear small. Therefore, if the amount of dominant color in a frame is large, the frame is part of a global view.

In a zoom-in view, the camera zooms to a small area in the field that is the focus of the game. It shows clearly the control of the ball by one player or several players. In this view, there is still some area 312 occupied by the grass. The last one is the close-up view. It shows players, coaches, referees, audience or so on. In this kind of view, there is very little area 311 covered by grass area. It happens most time during a break. Therefore, in a close-up view the amount of the dominant color is small.

If the amount of the dominant color that covers the frame is more than a first threshold, for example 50% of the frame, than the frame it is classified as a global view. If the amount of the dominant color is less than a second threshold, for example, less than 10% of the frame, than the frame is classified as a close-up view. Otherwise, the frame is classified as a zoom-in view.

Figure 4:
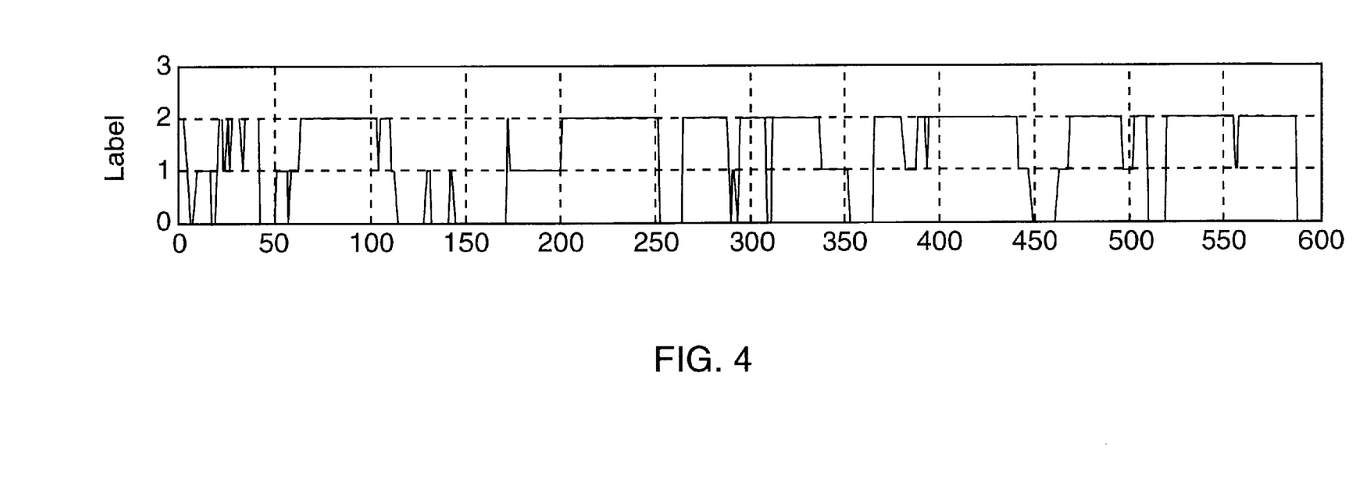
FIG. 4 is a graph of a label sequence used by the invention.
Figure 5:
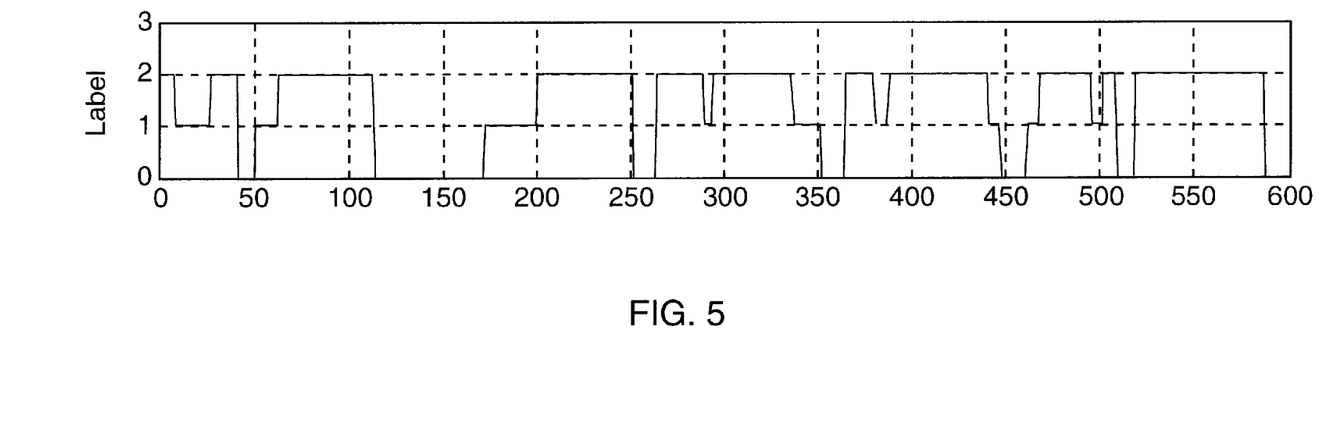
FIG. 5 is a graph of the label sequence of FIG. 4 after noise removal and label merge.

After classification, each I-frame is labeled 320 as 0, 1 and 2, corresponding to the three views, as shown in FIG. 4. Further noise removal and label merge can be performed before the classified views are used to segment the action into label sequence as shown in FIG. 5.

Figure 6A:
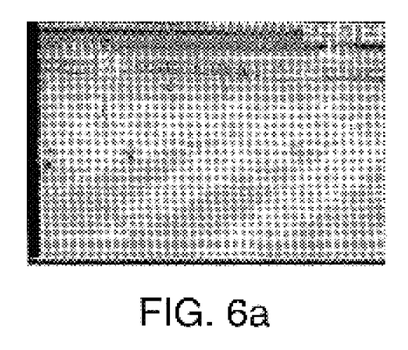
FIGS. 6a–c are images of different views in a sport video.
Figure 6B:
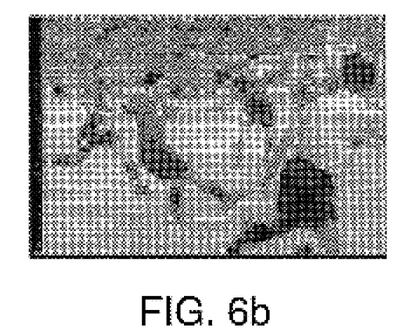
Figure 6C:
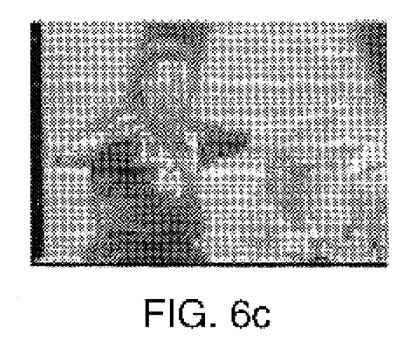

FIG. 6a–c show examples of color and view analysis with global, zoom, and close-up views, respectfully.

Action Segmentation

The games of soccer, ice hockey, and basketball have a relatively loose structure compared to other types of videos such as news, baseball. The only real structure are the equal length periods, and during a match, the ball or puck is either in play or out of play. The ball is out of play when the ball is out of the playing area—field, rink, or court, or the play is stopped by the referee, otherwise the play is continuously in play, unlike baseball.

According to this property, part of the domain structure of the game can be modeled as a sequence of plays and breaks. A play is defined as the period during which the ball or puck is in play, and define break as the period during which the ball is out of play. Events that start a play can include, a kicked off or face off, a throw-in, a free-kick, a goal-keeper kick, a corner-kick, or a penalty-kick, shot, or free throw. Events which stop play include a goal, ball out of play, a referees whistle indicating a fault, misconduct, or out of time. Between plays there are breaks. During the break, the players prepare, celebrate their goal, or get cautioned by the referee or are injured, and so on. For the viewer, activities within plays are more important than breaks, although exceptions may exist, for example, national or world victory celebrations.

Segmentation of Action according to View

We perform play-break segmentation based on these three different views. Close-up view typically corresponds to a break 331. Zoom-in views can happen within a play and between plays 332, and these two cases are different. During a play, zoom-in views give the on-going views of the game, while between the plays, they are typically replays, which replay the interesting parts that happen in previous play. So one approach is to use view classification techniques combined with replay detection techniques to achieve the play-break segmentation. Global views usually show developing plays 333.

Analysis

After segmenting the video into label sequences as described above, different analysis processes can be performed depending on whether it is the sequence is labeled as a play or break. During the break, the close-up gives the very close view of the player, coach or audiences. Pixel-domain techniques can be used to do more detailed analysis. For example, face recognition or character recognition can be done to identify the person in the view. Thus, it can be inferred who is the center of the last play. During a play sequence of labels, other features, such as grass orientation, motion magnitude, camera motion can be used to analyze information about the side switch, fight intensity, etc.

Playing Area Orientation

Orientation 144 of the playing field can also be part of the domain knowledge. Usually the playing area is delineated with lines of a color that contrasts with the dominant color, white for soccer, but possible other colors in other sporting games, such as the red and blue lines on the ice and the yellow line along the bottom of the boards in ice hockey.

In the global view, the lines are very clear and have different orientations depending on the view angle of the camera. The view angle of the camera depends on the relative location of the playing area. So the location of the play can be inferred from the line orientation.

When the camera shoots the right side of the field, the angle 341 of the line is greater than 90 degree; when it shoots the middle of the field, the angle is about 90 degree; when it shoots the left side, the angle is less than 90 degree. The change of the angle 342 indicates the change of the location of the action. When there is side switch, there is an angle change from greater than 90 degree to less than 90 degree or vice versa. The plays can be grouped according to the number of side switches.

We use the following process to determine the orientation of the lines. First, we use the Sobel gradient masks $S_x$, $S_y$ to get the gradient vectors $(g_x, g_y)$ from the intensity of the thumbnail image:

$$S_x = \begin{pmatrix} -1 & 0 & 1 \\ -2 & 0 & 2 \\ -1 & 0 & 1 \end{pmatrix}, \quad S_y = \begin{pmatrix} -1 & -2 & -1 \\ 0 & 0 & 0 \\ 1 & 2 & 1 \end{pmatrix}.$$

Pixels that have larger magnitude of the gradient than the threshold are kept as the edge points. The gradient orientation for an edge point is calculated by:

$$\alpha = \arctan \frac{g_y}{g_x}.$$

Figure 7:
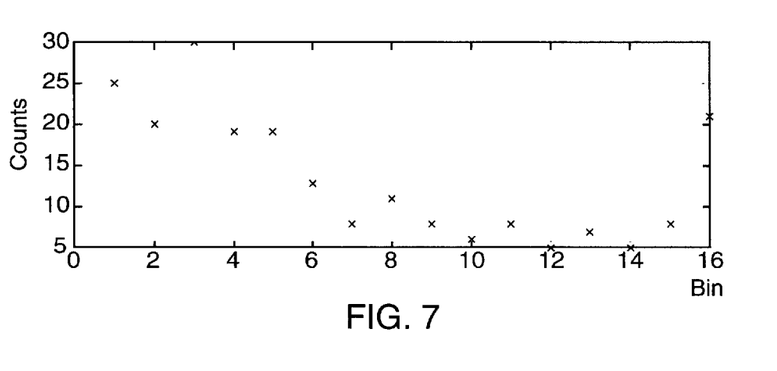
FIG. 7 is a line orientation histogram of all edge points inside a playing area.

Then, as shown in FIG. 7, a line orientation histogram is determined by the line orientations of all the edge points inside the playing area. The line orientation at the edge point is:

$$\beta = 90° - \alpha,$$

where $\beta$ is from 0 to 180 degree. The angle corresponding to the peak of the histogram is the angle for the orientation of the line. This determination is sufficient to approximate the location of the current play.

Camera Motion Estimation

In the global view, camera motion causes the global motion in the image frame. Because the camera tends to follow the movement of the ball or puck, camera motion typically indicates the motion of the action. Players are relatively small in the global view so that there is not much local motion. In this case, motion vectors are used to estimate the camera motion.

Because we use only I-frames to determine the color and orientation features, we also reduce the computation here to the P-frames immediately following I-frames.

Therefore, for each I-frame, we use motion vectors in the following P-frame to estimate the camera motion occurring at the I-frame. In the global view, camera motion is very simple. Most of the time, it has translation (pan/tilt). Occasionally it has zoom (zoom in/zoom out). Different models can be used for the estimation camera motion. We prefer a simple three parameter $\{k, p_x, p_y\}$ camera motion model The camera motion estimation can be considered as a two-step operation. First camera translates to the new center. Second camera zooms at the center. The coordinates $(x_c, y_c)$ of the center are always the same, $(x_c, y_c)=(w/2, h/2)$, w,h are the width and height of the frame, and therefore $$\begin{pmatrix} x' \\ y' \end{pmatrix} = k \begin{pmatrix} x - p_x - x'_c \\ y - p_y - y'_c \end{pmatrix} + \begin{pmatrix} x_c \\ y_c \end{pmatrix},$$

according to the definition of motion vector, $$\begin{pmatrix} u_{x'} \\ u_{y'} \end{pmatrix} = \begin{pmatrix} x \\ y \end{pmatrix} - \begin{pmatrix} x' \\ y' \end{pmatrix},$$

where (x, y) is the coordinate of a point in the reference frame (I-frame), (x', y') is the corresponding location in the current frame (P-frame), k is the zooming factor, and $(p_x, p_y)$ is the translation factor. Using the least squares method, we find the best $\{k, p_x, p_y\}$ that minimizes the squared error between the estimated motion vectors and the actual motion vectors obtained from the MPEG stream. That is, to find $\{k, p_x, p_y\}$, so that $S(k, p_x, p_y)$ is minimized by $$S(k, p_x, p_y) = \sum_{x'} \sum_{y'} [(u_{x'} - \hat{u}_{x'})^2 + (u_{y'} - \hat{u}_{y'})^2],$$

where (x', y') are the coordinates of all the macroblocks, and $(u_{x'}, u_{y'})$ is the estimated motion vector for macroblock at (x', y'), $(\hat{u}_{x'}, \hat{u}_{y'})$ is the corresponding motion vector from the stream.

After the estimation, real motion vectors that have large distance from the estimated motion vectors are filtered out. Estimation is repeated on the remaining motion vectors. The estimation is iterated several times to refine the accuracy. At the last iteration, the average motion vector magnitude can be computed from the motion vectors used for the final estimation. Because the estimation is performed on the motion vectors of P-frame that follows I-frame, and all the I-frames are from the segment of the play which has global view, most of the motion vectors in the P-frame are consistent with the global motion.

After the camera motion estimate, in each play, accumulated $p_x$ can be computed at each I-frame starting from the beginning of the play. This value represents the total camera motion along horizontal direction, and reflects the position change of the ball in the field along horizontal direction. This information together with orientation feature can give the more accurate information about the activity within each play. Also for each play, the average motion vector magnitude gives the level of the motion activity in this play, which indicates the intensity of the action in the play.

Figure 8:
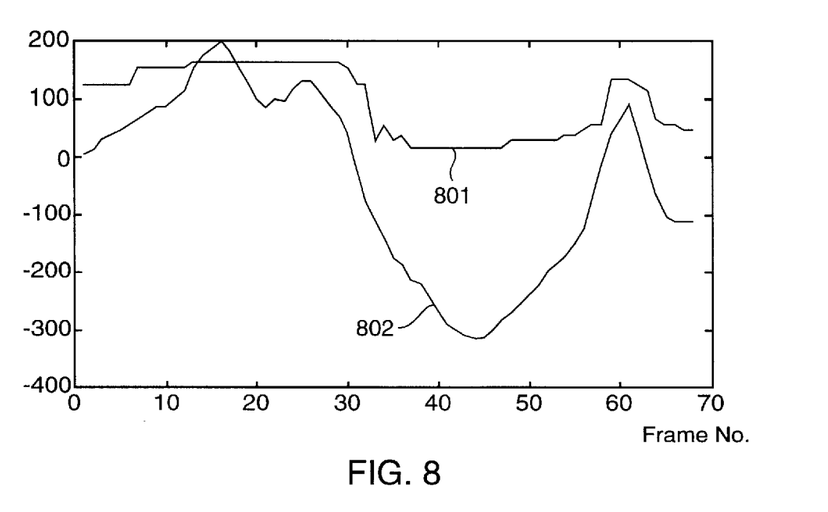
FIG. 8 is a graph of line orientations and a cumulative pan in a sport video.

FIG. 8 shows the line orientation 801 and cumulative pan along x 802 of one play in the video. It clearly indicates three side switches.

System Architecture

Figure 9:
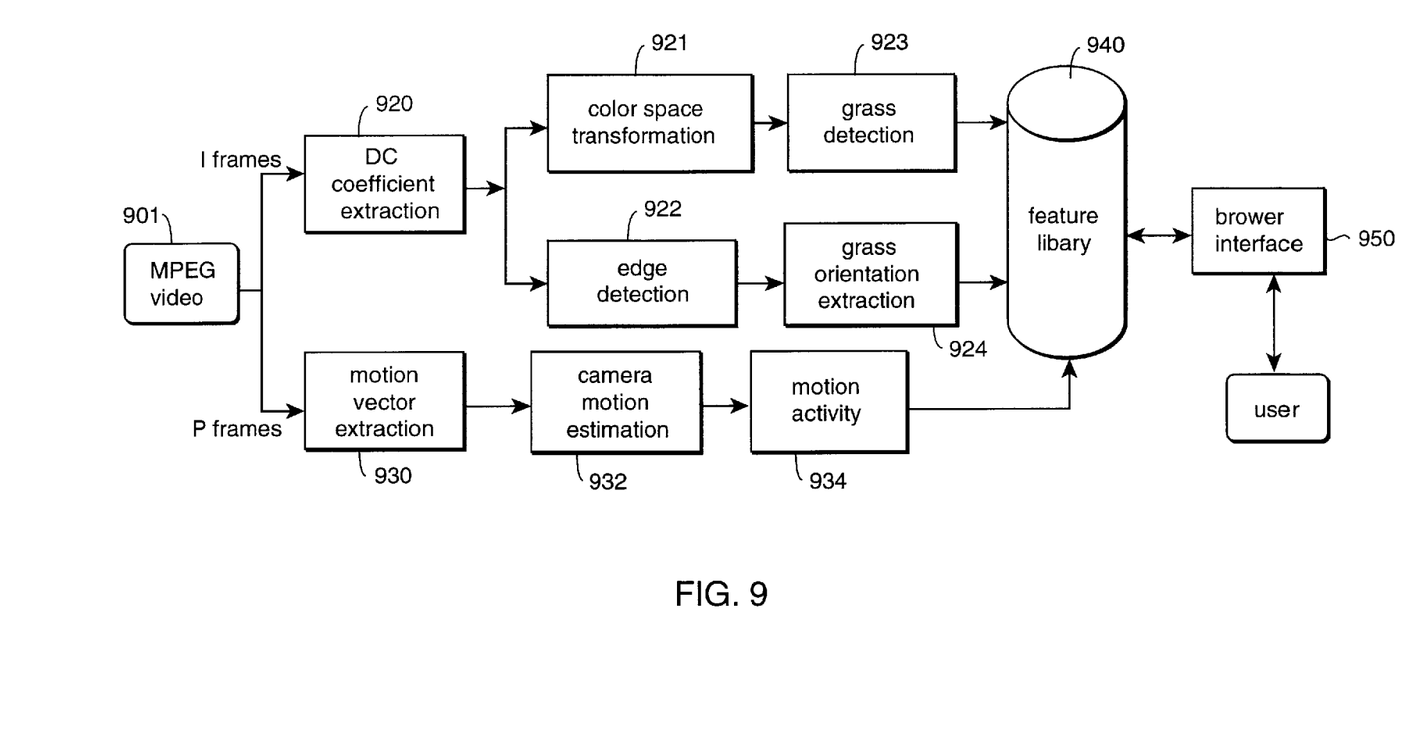
FIG. 9 is a flow diagram of an automatic structure analysis that can be used to browse and analyze sport videos according to the invention.

As shown in FIG. 9, our system and method provides an automatic structure analysis and summary system that can be used to browse and analyze sport videos 901. DC coefficient are extracted 920 from I-frames to determine color 921, grass 923, and edge 922 features. These features are used in turn to identify views and viewing orientation 924. Motion vectors are extracted 930 to determine camera motion 932, and motion activity 924. All of this information is stored in a library 940 that can be accessed by a user interface 950.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

What is claimed is:

1. A method for analyzing a compressed video including a plurality of frames, comprising:
   measuring an amount of a dominant feature in each frame of the compressed video;
   associating a label with each frame according the measured amount of the dominant feature;
   identifying views in the video according to the labels;
   segmenting the video into actions according to the views; and
   analyzing the video according to the action to determine significant events in the video.

2. The method of claim 1 wherein the dominant feature, labels, views, action, and significant events are stored in a domain knowledge database.

3. The method of claim 1 wherein the dominant feature is color, and further comprising:
   constructing a color histogram to identify the dominant feature.

4. The method of claim 1 further comprising:
   identifying a particular frame as a global view if the amount of the dominant feature is greater than a first threshold;
   identifying the particular frame as close-up view if the amount of the dominant feature is less than a second threshold; and otherwise
   identifying the particular frame as a zoom-in view.

5. The method of claim 3 wherein the first threshold is 50% of the frame, and the second threshold is 10% of the frame.

6. The method of claim 1 further comprising:
   removing noise from the labels; and
   merging substantially similar labels.

7. The method of claim 4 wherein the action is a break during the close-up view and a developing play during a global view.

8. The method of claim 4 wherein the action is a break during the zoom-in view if the zoom-in view is a replay, and a developing play otherwise.

9. The method of claim 1 wherein scenes in the video include a playing areas, and the playing area includes lines, and further comprising:
   determining an orientation of the lines.

10. The method of claim 9 further comprising:
    determining side switches according to a change of angle of the orientation of the lines.

11. The method of claim 1 further comprising:
    estimating camera motion in the video to determine an intensity of the action.

12. A system for analyzing a compressed video including a plurality of frames, comprising:
    a domain knowledge database storing a dominant feature, labels, view classifications, actions, and significant events;
    means for measuring an amount of the dominant feature in each frame of the compressed video;
    means for associating a particular label with each frame according the measured amount of the dominant feature;

means for identifying a particular view in the video according to the labels;

means for segmenting the video into the actions according to the views; and analyzing the video according to the action to determine the significant events in the video.

* * * * *